United States Patent [19]

Wood

[11] Patent Number: 4,644,047
[45] Date of Patent: Feb. 17, 1987

[54] SELF-COMPATIBILIZING PHTHALATE-BASED POLYESTER POLYOLS

[75] Inventor: Robert J. Wood, Round Lake Park, Ill.

[73] Assignee: Stepan Company, Northfield, Ill.

[21] Appl. No.: 755,678

[22] Filed: Jul. 15, 1985

Related U.S. Application Data

[63] Continuation-in-part of Ser. No. 622,670, Jun. 20, 1984, Pat. No. 4,529,744, and a continuation-in-part of Ser. No. 725,394, Apr. 22, 1985, Pat. No. 4,595,711, which is a continuation-in-part of Ser. No. 622,670, , which is a continuation-in-part of Ser. No. 436,551, Oct. 25, 1982, abandoned.

[51] Int. Cl.$^4$ .............................................. C08L 67/02
[52] U.S. Cl. .................................... 528/176; 528/194; 528/195; 528/288; 528/291

[58] Field of Search ............... 528/176, 194, 195, 288, 528/291

[56] References Cited

U.S. PATENT DOCUMENTS 3,298,974  1/1967  Bemstein et al. ................... 521/131

Primary Examiner—Maurice J. Welsh
Attorney, Agent, or Firm—Hill, Van Santen, Steadman & Simpson

[57] ABSTRACT

Phthalate polyester polyols comprising reaction products of a phthalic acid compound, a low molecular weight diol compound and a nonionic surfactant compound are provided which are compatibilized with fluorocarbon blowing agents. The polyols are producible by a simple heating process and are blendable with various conventional polyols and other additives to make resin prepolymer blends which can be catalytically reacted with organic isocyanates to produce cellular polyurethanes and polyurethane/polyisocyanurates.

21 Claims, No Drawings

SELF-COMPATIBILIZING PHTHALATE-BASED POLYESTER POLYOLS

RELATED APPLICATION

This application is a continuation-in-part of my earlier filed U.S. patent application Ser. No. 622,670 filed June 20, 1984 now U.S. Pat. No. 4,529,744 issued July 16, 1985, which in turn is a continuation-in-part of my earlier filed U.S. patent application Ser. No. 436,551 filed Oct. 25, 1982 now abandoned, the disclosure and contents of which are incorporated hereinto by reference.

This application is also a continuation-in-part of my earlier filed U.S. patent application Ser. No. 725,394 filed Apr. 22, 1985, now U.S. Pat. No. 4,595,711 which is a continuation-in-part application of 622,670 filed June 20, 1984 now U.S. Pat. No. 4,529,744 issued July 16, 1985 the disclosure and contents of which are incorporated herein by reference.

BACKGROUND OF THE INVENTION

1. Field Of The Invention

This invention lies in the field of polyols useful in formulating resin prepolymer blends for reaction with organic isocyanates to produce polyurethane and/or polyurethanepolyisocyanurate cellular polymers, and, more particularly, in the field of phthalate polyester polyols which are compatible with high levels of fluorocarbon blowing agents.

2. Prior Art

Aromatic polyester polyols are coming into widespread usage in the manufacture of polyurethane and polyurethanepolyisocyanurate foams. Such polyester polyols are attractive because they tend to be low in cost, yet can produce rigid cellular polymers of excellent properties adapted for many end use applications.

One class of aromatic polyester polyols which has recently become commercially available comprises esters produced by esterifying phthalic acid or phthalic acid anhydride with an aliphatic polyhydric alcohol. For example, a diethylene glycol phthalate is available commercially from Stepan Company, Northfield, Illinois. Such liquid product has a desirably low viscosity, a desirably high aromatic ring content, and a desirably low acid number. Even though such product typically has a reactive hydrogen functionality of less than about 3, it catalytically reacts well with organic isocyanates to produce, for example, rigid cellular polyurethanepolyisocyanurate polymer than can have commercially acceptable characteristics.

One problem with most such commercially viable aromatic polyester polyols is that they characteristically are poorly compatible with fluorocarbon compounds of the type conventionally used as blowing agents to make such cellular polymers.

The usual solution to this problem has been to admix with such a polyol a compatibilizing agent in an amount sufficient to produce a resulting mixture with a desired amount of compatibility (solubility) for fluorocarbons. For examples, Koehler et al U.S. Pat. No. 4,246,364 use a class of amide diols, while Wood U.S. Ser. No. 622,670 filed June 20, 1984 (now U.S. Pat. No. 4,529,744 issued Oct. 25, 1984) uses a combination of relatively high molecular weight propoxylate ethoxylate compounds with amine and/or amide diol compounds. The amide diols employed by Wood are similar to those taught by Koehler et al. The propoxylate ethoxylate compounds employed by Wood are, in fact, similar to those employed in one preferred mode of practicing the present invention, as hereinbelow described.

The necessity to compound a fluorocarbon compatibilizing agent with aromatic polyester polyol means an extra cost in the formulation of a so-called resin prepolymer blend. Such resin prepolymer blends are conventionally employed in the trade for reaction with organic isocyanates to produce polyurethane and/or polyurethane-polyisocyanurate cellular polymers. Resin prepolymer blends are uniform, homogeneous liquid compositions comprised of polyol, urethane-forming and/or isocyanurate-forming catalyst, fluorocarbon blowing agent, other optional additives, and, in the case of aromatic polyester polyols, a fluorocarbon compatibilizing agent, as is well known to those skilled in the art. A desired quantity of a compatibilizing agent is blended with an aromatic polyester polyol before such fluorocarbon is added, and such a blending step itself adds to the cost of resin prepolymer blend manufacture.

However, the cost of a compatibilizing agent is even more significant. Moreover, the costs of such an agent are escalating. For example, the cost of the cochin oil, which is used as a starting material to make the amide diol above identified, increased by approximately 60 percent in price in 1984. Unless the cost of producing resin prepolymer blends of aromatic polyester polyols can be controlled and maintained at economically competitive levels, aromatic polyester polyols will not have a commercial place in this field.

There is a need for fluorocarbon compatibilized aromatic polyester polyols which not only are economical to produce, but also are convertable into cellular foams having excellent properties.

Aromatic polyester polyols, especially phthalate polyester polyols, are producible by esterifying aromatic polycarboxylic acids with polyols, as is known. The idea of somehow modifying the components without substantially increasing cost so as to result in a polyol that is directly compatible (self-compatibilized) with fluorocarbons is certainly attractive. Not only would this avoid the need for a separate compatibilizing agent blending step, but also this would avoid the cost of an added compatibilizing agent.

Bernstein U.S. Pat. No. 3,298,974 provides a prior art attempt to prepare an aromatic polyester polyol which would be compatible with fluorocarbons. The Bernstein teachings recognize the desirability of using phthalic anhydride as a dicarboxylic acid for use in making a polyester polyol, but, for his esterification polyol, he employed only polyols containing at least 3 hydroxyl groups per molecule. To avoid the resulting high viscosity problems, use of an aliphatic dicarboxylic acid e.g., adipic acid, to replace portions of the phthalic anhydride is mentioned (see column 1, lines 20–45) as prior art. However, in the '964 patent, Bernstein describes polyester polyols produced by reacting a polycarboxylic acid of which aromatic dicarboxylic acid constitutes at least 25% by weight with an ethylene oxide adduct of an aliphatic polyhydric alcohol initially containing from 3 to 6 hydroxyl groups so that the resulting adduct contained 10 to 22 milliequivalents per gram of hydroxyl groups. Such a polyester polyol product was said to display increased fluorocarbon solubility and was said to be formed in the presence of some "higher molecular weight monocarboxylic or fatty acid" (see column 4, lines 25-43). Bernstein never taught low molecular weight diols for reaction with phthalic anhydride. The Bernstein polyester polyols are evidently not suitable for use in producing cellular polyurethane-polyisocyanurate type polymers of commercially acceptable quality. Apparently, these Bernstein products have never been successfully commercialized.

Windemuth et al British Patent No. 908,337 describes "reacting at least one polyhydroxyl and/or polycarboxylic compound with a molecular weight greater than 300 . . . with more than twice the quantity of polyisocyanate which is required for reaction" with the objective being to employ "a large excess of polyisocyanate" (see page 1, column 2, lines 62-84). Within "another large group of suitable starting materials (that) comprises linear or branched polyesters containing OH and/or COOH groups" phthalic acid and diethylene glycol are listed among many other compounds, and it is then stated that: "Polyesters . . . obtained from the aforesaid . . . can of course also be modified with monofunctional alcohols, amines, carboxylic acids, or saturated or unsaturated fatty acids, such as for example oleic acid." (see page 3, column 1, line 57 through column 2, line 90). Elsewhere it is indicated that such modifiers are added to reduce viscosity (see page 2, column 1, lines 18-46). No discussion of fluorocarbon compatibility whatever appears in Windemuth et al, and no phthalate polyester polyols made only of phthalic anhydride, low molecular weight diol, and such modifier is shown. The only phthalate containing polyester polyol illustrated appears in Example 35, and this polyol is "a mixture of 70 parts by weight of a polyester of 3 moles of polypropylene glycol (OH number 270) and 2 moles of adipic acid (acid number 2, OH number 84), 30 parts by weight of a polyester of 2 moles of phthalic acid anhydride, 1 mole of adipic acid, 1 mole of oleic acid and 5.3 moles of trimethylolpropane (OH number 353, acid number 0.5)" (see page 19, column 2, line 24 through page 20, column 1, line 5). The exemplified Windemuth et al aromatic polyester polyol systems are evidently not suitable for use in producing cellular polyurethane-polyisocyanurate type polymers of commercially acceptable quality, and apparently such have never been successfully commercialized.

So far as is known, no one has heretofore produced a class of phthalate polyester polyols which is both fluorocarbon self-compatibilizing, and also has a combination of low viscosity, low acid number, low reactive hydroxyl functionality (less than 3), and high aromatic ring content. Such a phthalate polyester polyol can be formulated into a resin prepolymer blend and then reacted with organic isocyanate to produce cellular polyurethane-polyisocyanurate type polymers of generally commercially acceptable quality.

BRIEF SUMMARY OF THE INVENTION

More particularly, this invention relates to a new and surprisingly useful class of phthalate polyester polyol blends comprised of reaction products of (a) phthalate acid compounds, (b) low molecular weight aliphatic diol compounds, and (c) certain nonionic surfactant compounds. The invention also relates to methods for making and using such phthalate polyester polyols, and further relates to cellular polyurethane and polyurethane/polyisocyanurate foams made therewith.

The polyol blends of this invention are fluorocarbon self-compatibilized, and, in addition, have a desirable combination of other characteristics which make them useful precursors for producing cellular polyurethane and/or polyurethane-polyisocyanurates.

The phthalate polyester polyols of the present invention are readily compoundable generally with prior art polyols, if desired, and also with the various additives conventionally used in the formulation of resin prepolymer blends.

The polyol blends of this invention are prepared by an esterification process which is simple, reliable, and well adapted for practice with conventional chemical processing equipment.

Other and further aims, purposes, features, objects, advantages, utilities, embodiments, and the like will be apparent to those skilled in the art from the teachings of the present specification taken with the appended claims.

DETAILED DESCRIPTION

Polyol Blend Characteristics

The phthalate polyester polyol blends of this invention, as indicated, are made using low molecular weight aliphatic diols. The present polyol blends differ from the above referenced prior art phthalate esters with low molecular weight aliphatic diols, such as diethylene glycol phthalate, in that, in effect, a portion of the low molecular weight diol needed to achieve a desired (theoretical) stoichiometry between the diol and the dibasic phthalate acid (or phthalic anhydride) is replaced by nonionic surfactant compound. Thus, the quantity of aromatic rings present in a product polyol is maintainable at a level closely related to that in such prior art corresponding unmodified phthalate ester polyols, but the quantity and nature of the aliphatic radicals present in a product polyol are altered to an extent desirable or necessary (the exact amount depending upon user wishes) to achieve fluorocarbon compatibilization with a minimum of unfavorable changes in product polyol properties. Thus, these product polyol blends are characterized by a surprising combination of properties, as now explained.

Most importantly, the product polyol blends are fluorocarbon compatibilized so that they can be formulated into resin prepolymer blends with little or preferably no added compatibilizing agent in order to produce a desired level of fluorocarbon solubility therein. Such a self-compatibilization is achieved easily and simply during an initial ester formation step through incorporating into a starting mixture of phthalic acid compounds low molecular weight aliphatic diols and nonionic surfactant compounds, as hereinbelow explained.

For another thing, these product polyol blends have relatively low viscosities. Viscosities typically fall in the range from about 200 to 50,000 centipoises (measured, for example, at 25° C. with a Brookfield viscometer), as is desirable for many end use applications for polyols being used in the manufacture of polyurethane and/or polyurethane/polyisocyanurate cellular products. If desired, the viscosity of a product blend of the present invention can be increased to some desired extent through incorporation into the starting mixture used for esterification a quantity of a polyfunctional (that is, having a functionality higher than 2) carboxylic acid or alcohol, as taught herein.

For another thing, these product blends characteristically have favorable product properties including, for example, compressive strength, tumble friability, and the like.

For another thing, these product blends are surprisingly capable of dissolving thereinto significant quantities of relatively high molecular weight propoxylate ethoxylate compounds without gelation subsequent upon addition of fluorocarbon. Thus, while Wood has previously discovered that such propoxylate ethoxylate compounds are useful fluorocarbon compatibilizing agents (as taught in the aforereferenced Wood U.S. Ser. No. 622,670 and also in Wood U.S. Ser. No. 725,394 filed Apr. 22, 1985), such propoxylate ethoxylate compounds are prone to cause gelation subsequent upon addition of fluorocarbon of a phthalate polyester polyol composition particularly at high use rates. Although such gelation apparently can be overcome by the additional presence of certain other agents, such as an amide diol, the need for such an additional agent is potentially objectionable because of the costs involved. A propoxylate ethoxylate compound can be dissolved in a phthalate polyester polyol blend of this invention without causing gelation upon subsequent addition of fluorocarbon and without the need for also adding a further additional agent, and the resulting mixture displays excellent and improved fluorocarbon compatibility characteristics.

In a further development of the present invention, there is provided a preferred class of phthalate polyester polyol blends which are prepared by incorporating into a starting esterification reaction mixture that is being esterified in accordance with this invention, a high molecular weight nonionic surfactant compound such as a propoxylate ethoxylate compound. Such compound becomes at least partially chemically reacted into the product phthalate polyester polyol blend during the esterification. The resulting product blend displays excellent and improved fluorocarbon compatibility characteristics, and cellular polymers produced therefrom display excellent tumble friability characteristics. Also, such a product blend appears to have a lower freezing temperature than corresponding blends produced by merely admixed thereinto after the esterification an equivalent amount of the same compound, which is believed to avoid certain processing problems and storage problems in winter. Further, if desired, additional quantities of such propoxylate ethoxylate compound can be admixed with such a product polyol blend after esterification without adding some additional agent and without causing gelation upon subsequent addition of fluorocarbon.

The phthalate polyester polyol blends of the present invention which contain such reacted and/or unreacted high molecular weight propoxylate ethoxylate compounds have an unusual and surprising ability to form, when catalytically reacted with organic isocyanates, cellular foams of not only superior tumble friability, but also superior uniform small sized cell structure.

In general, a self-compatibilized phthalate polyester polyol blend of this invention comprises the reaction product of a mixture which comprises on a 100 mole percent total basis: having:

(A) from about 15 to 40 mole percent of at least one phthalic acidic material selected from the group consisting of phthalic anhydride, phthalic acid, isophthalic acid, terephthalic acid, and mixtures thereof, (B) from about 40 to 75 mole percent of at least one low molecular weight aliphatic diol characterized by the generic formula:

$$HO-R^1-OH \qquad (1)$$

where: $R^1$ is a divalent radical selected from the group consisting of
  (a) alkylene radicals each containing from 2 through 6 carbon atoms, and
  (b) radicals of the formula:

$$-(R^3O)_n-R^3- \qquad (2)$$

where: $R^3$ is an alkylene radical containing from 2 through 3 carbon atoms, and n is an integer of from 1 through 3, and
  (c) mixtures thereof, and (C) from about 0.4 to 28 mole percent of a mixture of least nonionic surfactant compound which is characterized by:
  (1) containing from about 10 to 600 carbon atoms per molecule, and
  (2) containing at least one and not more than four radicals per molecule,
  (3) containing from about 4 to 240 radicals per molecule of the formula $$-(R^3O)-$$

where: R3 is as above defined,

Optionally, such a nonionic surfactant can contain up to about 3 carboxyl groups per molecule, as when a nonionic surfactant compound comprises an ethoxylated castor oil. By the term "nonionic surfactant" reference herein is had to a compound which contains both a hydrophobic moiety and a hydrophillic moiety and which has substantially no moieties which dissociate in aqueous solution or disperse into cations or Preparation Conditions In general, a self-compatibilized phthalate polyester polyol blend of this invention is prepared by heating at a temperature ranging from about 180° to 240° C. a starting mixture as above characterized.

Such heating of a starting mixture is continued until a liquid reaction product is produced which is characterized by having:

(A) an hydroxyl number ranging from about 200 to 500,
(B) an acid number ranging from about 0.1 to 7,
(C) a saponification value) ranging from about 130 to 400,
(D) a viscosity ranging from about 200 to 50,000 centipoises measured a 25° C. using a Brookfield viscometer.

The "saponification value" is defined by the number of milligrams of potassium hydroxide required to react with the ester group present in one gram of sample. To determine saponification value, the American Chemist's Society official Method No. C-d-3-25 is employed.

Reaction (heating) time can vary, but typically ranges from about 8 to 16 hours, but longer and shorter times can be employed depending upon temperature, starting mixture composition, and like factors, without departing from the invention.

Process conditions are summarized in Table I below:

TABLE I

| CONDITION | Process Conditions* | |
|---|---|---|
| | BROAD | PREFERRED |
| 1. Temperature | 110–240° | 210–230° C. |

TABLE I-continued

| | Process Conditions* | |
|---|---|---|
| CONDITION | BROAD | PREFERRED |
| 2. Pressure | 10 to 760 mm of Hg | autogeneous |

*The reactants are agitated during processing and preferably sparged with an inert gas (e.g. nitrogen) to aid in the removal of water vapor.

Starting Mixture

The composition of a starting mixture as indicated above is summarized in Table II below:

TABLE II

Starting Mixture (100 mole % total basis)

| | | Range | | |
|---|---|---|---|---|
| Item | Reactive Component | Broad | Preferred | More Preferred |
| 1. | phthalate acidic material | 15–40 | 20–35 | 20–30 |
| 2. | aliphatic diol | 40–75 | 35–60 | 30–50 |
| 3. | nonionic surfactant compound | 0.4–28 | 2–15 | 0.1–2 |
| 4. | low molecular weight nonionic surfactant compound | 0–28 | 0.1–15 | 0.1–10 |
| 5. | high molecular weight nonionic surfactant compound | 0–1.00 | 0.03–0.80 | 0.04–0.5 |
| 6. | aliphatic polyol (other than diols) | 0–20 | 0–15 | 0–5 |
| 7. | polycarboxylated aromatic acid compound (other than dicarboxylated) | 0–20 | 0–15 | 0–10 |
| 8. | polycarboxylated aliphatic acid compound | 0–20 | 0–15 | 0–10 |
| 9. | phthalic anhydride bottoms composition | 0–40 | 0–30 | 0–20 |

*Value herein identified for any given mixture must conform with the compositional limits disclosed above for polyol blends of this invention.

A starting mixture always contains phthalic acidic material, aliphatic diol, and nonionic surfactant compound as shown in Table II.

A presently preferred phthalate acidic material (item 1 of Table II) comprises phthalic anhdyride. Mixtures of such phthalic acidic materials can be employed if desired.

In place of a relative pure starting phthalic acid material, one can employ a mixture of phthalic acid materials. One presently preferred such mixture comprises a phthalic anhydride bottoms composition. Such a composition is described and characterized (including preferences) in my earlier filed U.S. patent application Ser. No. 507,532, filed June 4, 1985 now U.S. Pat. No. 4,521,611. Such bottoms composition can be used in admixture with any phthalic acid starting material in any proportion desired, within the total quantity ranges above indicated.

Examples of other suitable aliphatic diols of formula (1) include ethylene glycol, propylene glycol, dipropylene glycol, trimethylene glycol, butylene glycols, 1,2-cyclohexanediol, poly (oxyalkylene) polyols each containing from two to three carbon atoms derived by the condensation of ethylene oxide, propylene oxide, or any combination thereof, and the like. As those skilled in the art will appreciate, in the preparation of mixed poly(oxyethylene-oxypropylene) polyols, the ethylene and propylene oxides may be added to a starting hydroxyl-containing reactant either in admixture or sequentially. Mixtures of such diols can be employed, if desired. A presently most preferred aliphatic diols of formula (1) is diethylene glycol.

Any nonionic surfactant compound can be employed. In general, in the practice of the present invention, it is preferred that the nonionic surfactant contain from about 4 to 240 individual oxyalkylene groups per molecule with the oxyalkylene groups typically being selected from the group consisting of oxyethylene and oxypropylene.

The hydrophobic portion of a nonionic surfactant is preferably derived from at least one starting compound which is selected from the group consisting of:
(a) Fatty alcohols containing from about 6 to 18 carbon atoms each,
(b) Fatty amides containing from about 6 to 18 carbon atoms each,
(c) Fatty amines containing from about 6 to 18 carbon atoms each,
(d) Fatty acids containing from 6 to 18 carbon atoms each,
(e) Phenols and/or alkyl phenols wherein the alkyl group contains from about 4 to 16 carbon atoms each, and
(f) A fat or oil containing from 6 to about 60 carbon atoms each,
(g) polypropylene glycols containing from 10 to 70 moles of propylene oxide, and
(h) mixtures thereof.

In making a nonionic surfactant, such a starting compound is sufficiently alkoxylated to provide a desired hydrophilic portion. Typically, alkoxylation results in chains totaling from about 3 to 125 moles of alkylene oxide per molecule with the alkylene oxide preferably being selected from the group consisting of ethylene oxide, propylene oxide, and mixtures thereof.

One presently preferred class of low molecular weight nonionic surfactants employable in the practice of this invention is characterized by the formula:

$$RO(CH_2H_2O)_nH \qquad (3)$$

R is a radical selected from the group consisting of alkyl phenyl radicals wherein the alkyl group in each such radical contains about five to eighteen carbon atoms, alkyl radicals each containing from two through eighteen carbon atoms, and
n is a positive whole number which is sufficient to keep the molecular weight of the product surfactant below about 1500.

It is presently preferred that nonionic surfactants employable in the practice of the present invention be characterized by containing block units of ethylene oxide and of propylene oxide. Thus, the hydrophobic part of a molecule contains recurring propylene oxide units, or, in some cases, mixed units of largely propylene oxide with some ethylene oxide. Nonionic surfactants employed in the practice of this invention can contain either or both condensed ethylene oxide and propylene oxide units.

Optionally and preferably such a starting nonionic surfactant is a mixture of nonionic surfactant compounds. Such a mixture can optionally contain during such heating, on such 100 weight percent total starting mixture basis, from 0 to about 30 weight percent of at least one relatively high molecular weight nonionic propoxylate ethoxylate compound that is, such a compound that has a molecular weight ranging from about 1200 to 13,000. Preferably such a compound contains at least one block polyoxypropylene group containing at least about 10 propoxy units and also at least one block polyoxyethylene group containing at least about 20 ethoxy units.

One presently particularly preferred class of such nonionic propoxylate ethoxylate compounds is characterized by (1) a molecular weight of from about 3000 to 8000,
(2) a solubility in diethylene glycol phthalate to the extent that at least 5 parts by weight of such nonionic propoxylate ethoxylate is soluble in diethylene glycol phthalate (that is, a stoichiometric reaction product of one mole of phthalic acid anhydride with two moles of diethylene glycol or equivalent)
(3) at least one block polyoxypropylene group which contains from about 25 to 50 repeating propoxy units,
(4) at least one block polyoxyethylene group which contains from about 40 to 125 repeating ethoxy units,
(5) both a hydrophobic moiety and a hydrophilic moiety, In such a nonionic surfactant as above characterized, the total alkoxyl content must include at least 40 weight percent of ethylene oxide, and preferably the ethylene oxide content ranges from about 55 to 75 weight percent, and most preferably the ethylene oxide content ranges from about 60 to 70 weight percent. Preferably such a nonionic surfactant is end capped with at least one ethylene oxide group.

Optionally, after its formation by a heating step as described herein, a liquid product blend of this invention can be admixed with, and/or have dissolved or dispersed therein, for each 100 parts by weight of such liquid reaction product, from 0 to about 30 parts by weight of at least one such high molecular weight propoxylate ethoxylate compound. Such an admixture and dissolution preferably carried out while maintaining a temperature ranging from about 50 to 100° C.

However, the total quantity of such propoxylate ethoxylate compound present in such product polyol blend, whether such compound is present during such heating or is subsequently admixed with such a reaction product, as indicated, ranges from greater that 0 to about 30 weight percent on a 100 weight percent total liquid reaction product basis.

In addition to the such phthalate acid compound, such aliphatic diol, and such nonionic surfactant compound, a starting mixture can also, if desired, contain minor amounts of certain other reactive components, that is, compounds having three or more functional hydroxyl and/or carboxyl groups per molecule. Such compounds can be used to increase and to regulate viscosity of a product polyol blend. Thus, polyols (especially aliphatic polyols), polycarboxylated aromatic acid compounds, and polycarboxylated aliphatic acid compounds can be employed (as shown in Table II above).

Thus, optionally, and for example, such a starting mixture can incorporate low molecular weight polyols (that is, compounds which preferably contain less than 6 carbon atoms per molecule but which contain at least three hydroxyl groups per molecule). Example of such polyols comprise glycerol, trimethylolpropane, trimethylolethane, sorbitol, pentaerythritol, mixtures thereof, and the like.

Also, optionally, and for example, such a starting mixture can incorporate aromatic polycarboxylic acid or acid anhydride compounds (that is, aromatic carboxylated compounds which contain at least three carboxyl groups per molecule (including anhydrides) and which preferably contain less than 12 carbon atoms per molecule). Example of such aromatic polycarboxylated acid compounds comprise trimellitic anhydride, trimellitic acid, mixtures thereof, and the like.

Further, optionally, and for example, such a starting mixture can incorporate aliphatic polycarboxylic acid or acid anhydride compounds (that is, aliphatic carboxylated compounds which contain at least two carboxyl groups per molecule and which preferably contain less than 8 carbon atoms per molecule) Examples of such aliphatic polycarboxylated acid compounds comprise adipic acid, glutaric acid, succinic acid, mixtures thereof, and the like.

Phthalate Polyester Polyol Blends

A liquid blend of this invention prepared from a starting mixture as above described using preparation conditions above described has characteristics as above indicated and as summarized in Table III below:

TABLE III

| | Product Phthalate Polyester Polyol Blends | | |
|---|---|---|---|
| | | Range | |
| Item | Characteristic or Property | Broad | Preferred | More Preferred |
| 1. | hydroxyl number | 200–500 | 225–400 | 250–300 |
| 2. | acid number | 0.10–7.0 | 0.2–5.0 | 1.0–3.0 |
| 3. | Saponification value | 130–400 | 150–350 | 250–300 |
| 4. | viscosity (centipoises)* | 200–50,000 | 500–20,000 | 1000–500 |

*measured with a Brookfield viscometer at 25° C.

In general, and as indicated above a polyol blend of this invention comprises a reaction product of the respective indicated quantities of starting (a) phthalate acidic material, (b) low molecular weight aliphatic diol of formula (1), and (c) nonionic surfactant compound (as above characterized). Such a polyol blend is also a reaction product of any other minor additional components present in a starting mixture, as described above. In effect, during the heating (esterification), the phthalic acidic material becomes esterified by the hydroxyl group containing compounds present, thereby producing phthalate polyester polyols. A reaction product is thus a complex mixture of various compounds.

The quantity of phthalate polyester polyol present in any given product is proportional to the quantity of phthalate acidic material present in a starting mixture. Such a phthalate polyester polyol is formed not only by the esterification reaction of aliphatic diol of formula (1) with phthalate acidic material, but also by esterification reactions of such acidic material with other hydroxyl-group containing compounds present in a starting mixture.

The fact that a product of this invention is an interreacted system derived from the starting components present in a starting mixture can be demonstrated by any convenient means. When, for example, a starting mixture and a corresponding product mixture are examined by HPLC (high pressure liquid chromatography) it is found that the reaction product has a most substantially altered composition compared to that of the starting mixture.

Also, HPLC analysis shows that a polyol blend reaction product of this invention has a substantially different composition from a mixed composition which has been prepared by mixing together (a) such a phthalic acid starting material which has been esterified with only an aliphatic diol of formula (1) (such as a reaction product of phthalic anhydride with diethylene glycol) under similar process conditions to those process conditions used in the practice of the present invention, and (b) such a nonionic surfactant compound (and other optional additives) to form a mixture.

Further, HPLC analysis of a product polyol blend appears to characteristically show peaks in the 15 to 17 minute range when using a Regis octodecylsilane column with 5 micron packing and having a length of about 25 centimeters, such peaks appear to be absent when mere physical mixtures of nonionic surfactant compound and/or hydrophobic compound in a phthalate polyester polyol made with a low molecular weight diol (e.g. formula (1) diol) are involved.

Furthermore, in the case of the class of preferred liquid reaction products of this invention which have incorporated into a starting mixture a high molecular weight nonionic propoxylate ethoxylate compound, it is found by HPLC analysis that such products display a characteristically different composition from that shown by, for example, a diethylene glycol phthalate to which has been added (not reacted) such a nonionic surfactant compound.

The Freon solubility capabilities of a product phthalate polyester polyol blend, or of a resin prepolymer blend made therefrom, can be readily determined, particularly when such a polyol blend is a clear liquid. Most product polyols of this invention are clear liquids, although their color can range from water white (or colorless) to dark brown or amber. Product polyols produced through the use of phthalate bottoms in a starting mixture have a black color which is characteristically very dense, and it is presently difficult if not impossible to measure accurately by known techniques the Freon solubility capability or characteristics of such a black liquid product polyol. For present purposes generally, freon solubility is conveniently measured or defined as the maximum amount of trichlorofluoromethane (known commercially as Freon 11, available from the duPont Company) which can be dissolved in a polyol blend.

Resin Prepolymer Blends

Resin prepolymer blends of this invention can be easily and conveniently prepared from a product polyol blend of this invention by admixing therewith a urethane-forming, an isocyanurate-forming, or mixed polyurethane/polyisocyanurate forming catalyst or catalyst system. In addition, a fluorocarbon blowing agent is admixed therewith (dissolved therein).

Many different types of resin prepolymer blends using polyols of this invention can be prepared using the additives, polyols, and know-how familiar to those skilled in the art. The polyols of this invention appear to be readily blendable with such materials.

One presently preferred and illustrative class of prepolymer resin blend formulations which incorporate polyol blends of this invention and which is particularly suitable for making polyisocyanurate foams is characterizable as shown in the following Table IV:

TABLE IV

Preferred Resin Precursor Blends For Polyisocyanurate Foams (100 weight percent basis)

| Item No. | Component | wt. % Preferred range | wt. % More Preferred Range |
|---|---|---|---|
| (A) | polyol blend | 20–65 | 40–60 |
| (B) | trimerization catalyst | 1.0–7.0 | 1.5–5.0 |
| (C) | cell stabilizing surfactant | 0–5.0 | 1.0–2.0 |
| (D) | fluorocarbon blowing agent | 20–40 | 25–35 |
| (E) | low molecular wt. nonionic surfactant | 0–20 | 0–10 |
| (F) | high molecular wt. nonionic surfactant | 0–20 | 0–10 |
| (G) | other additives | 0–15 | 0–10 |

One presently perferred and illustrative class of prepolymer resin blend formulation which incorporate polyol blends of this invention and which is particularly suitable for making polyurethane foams is characterizable as shown in the following Table V.

TABLE V

Preferred Resin Precursor Blends For Polyurethane Foams (100 weight percent basis)

| Item No. | Component | wt. % Preferred range | wt. % More Preferred Range |
|---|---|---|---|
| (A) | polyol blend | 20–65 | 40–60 |
| (B) | urethane forming catalyst | 0.5–10.0 | 2.0–4.0 |
| (C) | cell stabilizing surfactant | 0.5–3.0 | 1.0–2.0 |
| (D) | fluorocarbon blowing agent | 0–30 | 5–20 |
| (E) | water | 0–20.0 | 0–2 |
| (F) | low molecular wt. nonionic surfactant | 0–10 | 0–5 |
| (G) | high molecular wt. nonionic surfactant | 0–10 | 0–5 |

Preferably the viscosity of such a B-side resin prepolymer blend formulation of Table IV or V ranges from about 100 to 2000 centipoises at 25° C. (measured, for example, with a Brookfield viscometer) and the hydroxyl number thereof falls in the range from about 80 to 300.

EMBODIMENTS

The present invention is further illustrated by reference to the following examples. Those skilled in the art will appreciate that other and further embodiments are obvious and within the spirit and scope of this invention from the teachings of these present examples taken with the accompanying specification. Unless otherwise indicated all product polyol blends of this invention hereinbelow described have a saponification value of from about 130 to 400.

Example A

A diethylene glycol phthalate for testing and comparison purposes is prepared as follows:

To a 3 liter, four-neck, round-bottom flask equipped with a stirrer, thermometer, nitrogen inlet tube, and a distilling head consisting of a straight adaptor with a sealed-on Liebig condenser, there is added 740 grams (5 moles) of phthalic anhydride, and 1060 grams (10 moles) of diethylene glycol. The mixture is heated to 220° C. with stirring and kept at this temperature until the rate of water being removed slowed down.

Stannous octoate (100 ppm) is then added to the mixture and the heating continued until the acid number reaches 6.2. The reaction mixture is then cooled to room temperature and analyzed. The hydroxyl number is found to be 288 and the acid number 6.2 Diethylene glycol is added to the mixture to increase the hydroxyl number to 315.

The product includes diethylene glycol phthalate molecules. This product is a colorless liquid which has a hydroxyl number of about 315 and has a viscosity of about 2500 centipoises at 25° C. measured with a Brookfield viscometer operating at 3 rpm with a #3 spindle and an hydroxyl number of about 315.

Example B

A specimen of a phthalic anhydride bottoms composition is obtained from Stepan Company having:

(a) a phthalic anhydride content of about 60 weight percent (total composition basis),
(b) a hydroxyl number estimated to be about 0, and
(c) an acid number estimated to be about 700.

The phthalic anhydride bottoms used as a starting material in the practice of the present invention results from the process of converting o-xylene to phthalic anhdyride.

Distillation of the reaction product known as "crude" or "PA crude" results in a first distillate known as "light ends" or "phthalic anhydride light ends", a second distillate comprising substantially pure phthalic anhydride and a residue known as bottoms or phthalic anhydride bottoms. The crude, the light ends and the bottoms can each be regarded as having a somewhat variable composition, such compositional variations being the result of variations in the starting o-xylene feed, and also of variations in the exact conditions employed for the respective process steps.

In actual commercial practice, it is believed that, in a bottoms composition, the quantity of phthalic anhydride present can range from a low of about 10 weight percent to a high of about 99 weight percent on a 100 weight percent total bottoms basis, with the balance up to 100 weight percent thereof in any given bottoms compositions being mainly trimellitic acid and/or trimellitic acid anhydride plus insolubles.

Similarly, in actual commercial practice, it is believed that, in a light ends composition, the quantity of phthalic anhydride present can range from a low of about 45 weight percent up to a high of about 90 weight percent on a 100 weight percent total light ends basis, with the balance up to 100 weight percent thereof in any given light ends composition being mainly benzoic acid, (of benzoic acid anhydride) and maleic acid anhydride (or maleic acid).

Example C

A starting phthalic anhydride bottoms composition is selected which has the following characteristics:

TABLE VI

| Characteristics | Broad Range | Preferred Range |
| --- | --- | --- |
| hydroxyl number | about 0 | about 0 |
| acid number | 100–750 | 450–750 |
| phthalic anhydride content | 10–99 wt % | 50–95 wt % |

In Table VI, the phthalic anhydride weight percentage is based upon total compositional weight of a starting phthalic anhydride bottoms composition in the esterification procedure.

Alternatively, a crude or light ends composition is employed. With such a starting phthalic anhydride bottoms composition is admixed at least one polyol of formula (1) above to produce an initial mole ratio of said polyol to said phthalic anhydride bottoms composition in the range from about 1.9 to 3.0 based upon an estimate of the total acid (e.g., carboxylic acid and/or carboxylic acid anhydride) content of said phthalic anhydride bottoms composition. A presently most-preferred polyol for reaction with phthalic anhydride bottoms starting material is diethylene glycol.

Although phthalic anhydride bottoms comprise mainly phthalic acid anhydride, the remaining components of the phthalic anhydride bottoms mainly appear to comprise components which are acidic in nature and which react with a polyol of formula (1) presumably to produce ester by-products, although the exact composition of the reaction product of a polyol of formula (1) and phthalic anhydride bottoms is at this time not known.

A condensate of diethylene glycol and a phthalic anhydride bottoms composition of Example B for testing and comparison purposes is prepared as follows:

To a 3-liter, four-neck, round-bottom flask equipped with a stirrer, thermometer, nitrogen inlet tube and a distilling head consisting of a straight adapter with a sealed-on Liebig condenser, there is added at ambient temperature and pressure 740 grams of the above pulverized phthalic anhydride bottoms and 1060 grams (10 moles) of diethylene glycol. The mixture is heated to 220° C. and kept at this temperature until the acid number of the reactant mixture is found to be about 7.0. The mixture is then cooled to room temperature and the hydroxyl number of the relatively viscous black liquid product is determined and found to be about 312. The mixture has a viscosity of about 25,000 centipoises at 25° C. measured using a Brookfield viscometer with a #3 spindle operating at about 1.5 rpm.

Example D

An alkoxylated glycerine is obtained from Stepan Company under the trade description "Stepanfoam Polyol 2403". This material has the following characteristics:
hydroxyl number: about 230–245
functionality: about 3
molecular weight: about 700

Example E

An alkoxylated sucrose is obtained from Stepan Company under the trade designation "Stepanfoam Polyol 3708". Such alkoxylated sucrose has the following characteristics:
hydroxyl number: about 365 to 395
functionality: about 8
molecular weight: about 1,200

Example F

A 17006 pound batch of presently preferred nonionic block propoxylate ethoxylate of nonyl phenol is produced by first charging 3,900 lbs of appropriate nonyl phenol feed stock to an appropriate alkoxylation reactor of the proper size. This material is then heated to 110° C. and an appropriate amount of potassium hydroxide catalyst is added. After the addition of the catalyst, 4106 pounds of propylene oxide (about 35 moles of addition) is added slowly. Care should be taken to maintain a reaction temperature of between 110° C. to 160° C. during the addition of the propylene oxide. After this addition, the reactor is brought to approximately 110° C. and about 9000 pounds of ethylene oxide (about 65 moles of addition) are added to the reactor very slowly. This is a very exothermic reaction and care should be taken to maintain a reaction temperature of between about 110° to 160° C. The ethoxylation is terminated when the appropriate degree of ethoxylation is achieved; this should occur after approximately all of the 9000 pounds of ethylene oxide are added to the reactor. Proper agitation in the alkoxylation should be maintained during both ethylene oxide and propylene oxide additions. The product contains about 65 moles of condensed ethylene oxide in block form and about 35 moles of condensed propylene oxide in block form.

The product has the following characteristics:
molecular weight: about 4800
hydroxyl number: about 12
functionality: about 1
physical state: solid at 25° C.

Example G

A mixed ethoxylated propoxylated ethoxylated butanol is obtained as "Tergitol XH" from Union Carbide Company. This product is believed to have the following approximate characteristics:
molecular weight: about 2400 to 3500
hydroxyl number: about 13 to 24
functionality: about 1
physical state: solid at 25° C.
moles ethylene oxide condensed: about 20 to 50
moles propylene oxide condensed: about 20 to 50 See U.S. Pat. No. 3,078,315

Example H

An ethoxylated propoxylate ethoxylate is obtained as "Pluronic P-75" from BASF Wyandotte Company. This product is believed to have the following approximate characteristics:
molecular weight: about 3500 to 14000
hydroxyl number: about 8 to 32
functionality: about 2
physical state: solid at 25° C.
moles ethylene oxide condensed: 30 or more
moles propylene oxide condensed: 30 or more

Example I

An organic polyisocyanate trimerization catalyst is obtained under the trade designation "Hex-Cem 977" from the Moody Chemical Company. This catalyst is believed to comprise potassium octoate in glycol.

Example J

A silicone cell stabilizing surfactant is obtained under the trade designation "DC-193" from Dow Corning Company. This surfactant is believed to be comprised of a polyalkylene oxide silicone.

Example K

An aromatic amine polyol is obtained under the tradename "Thanol R-350-X" from Texaco Chemical Corporation. The polyol is believed to be a phenolic based aromatic amine.
hydroxyl number: about 530
functionality: about 4 to 5
equivalent weight: about 105 (calculated)

Example L

A trimerization catalyst is obtained under the tradename "TMR-2" from Air Products Company. The catalyst is believed to be an ammonium compound of an organic base.

Example M ("Pluronic P-65"), Ethoxylated propoxylated nonionic surfactant available from BASF Wyandotte.

Example N ("Makon 6"), Ethoxylated nonyl phenol available from Stepan Company.

Example O

A condensate of phthalic anhydride with a triol for testing and comparison purposes is prepared as follows:

To a 5 liter, four-neck, round-bottom flask equipped with a stirrer, thermometer, nitrogen inlet tube, and a distilling head consisting of a straight adapter with a sealed-on Liebig condenser, there is added 1480 grams (10 moles) of phthalic anhydride and 2680 grams (20 moles) of 1,1,1-trimethylolpropane. The mixture is heated to 220° C. with a stirring and kept at this temperature until the acid number is 5. The reaction mixture is then cooled to room temperature and analyzed. The hydroxyl number is found to be 565.2. The product is gel-like material at 25° C.

This example illustrates the high viscosity nature of phthalate polyester polyols made with polyols.

Example P

A polyol of phthalic anhydride with a triol (1,1,1-trimethylolpropane) and a polyalkoxylated modifier is prepared as follows:

The procedure of Example is repeated except that there is added to the starting mixture 1040 grams (2.16 moles) of Makon 6. reaction product is found to have an hydroxyl number of 471.1 but is a gel-like material at 25° C.

This example illustrates that triols tend to make phthalate polyester polyols which are excessively viscous even when a low molecular weight polyalkoxylated modifier is present in a starting mixture.

EXAMPLES OF THE INVENTION

Example 1—Preparation Of A Polyol Blend From Makon 6, Phthalic Anhydride, And Diethylene Glycol To a three liter, four-neck, round-bottom flask equipped with stirrer, thermometer, Barrett distilling receiver, condenser, and nitrogen inlet tube is charged 444.0 grams of phthalic anhydride, 592.2 grams of diethylene glycol, and 245.5 grams of Makon 6 (19% by weight based on total weight of phthalic anhydride, diethylene glycol and such Makon 6).

This mixture is heated to 225° C. with constant agitation and with a constant nitrogen sparge. After removing approximately 90% of the theoretical water, 200 ppm of stannous octoate is added to the flask as an esterification catalyst. Additional material removed from the distilling receiver is replaced by an equal weight of diethylene glycol. The heating is continued until the acid value of the product liquid is 2.8. The product polyol has a hydroxyl number of 251.8, a viscosity of 2176 cps at 25° C., and contains 0.02% water.

Example 2—Preparation Of A Polyol Blend From PO-EO Block Polyol Polymer (Example F) Phthalic Anhydride, And Diethylene Glycol To a three liter, four-neck, round-bottom flask equipped with stirrer, thermometer, Barrett distilling receiver, condenser, and nitrogen inlet tube is charged 444.0 grams of phthalic anhydride, 560.8 grams of diethylene glycol, and 60.7 grams of PO-EO block polymer (Example F). This mixture is heated to 225° C. with constant agitation and with a constant nitrogen sparge. After approximately 95% of the theoretical water has been removed, 200 ppm of stannous octoate is added to the flask. Any additional material taken from the distilling receiver is replaced by an equal weight of diethylene glycol. The reaction is carried out until the acid value is approximately 2.1 and the hydroxyl number is about 260.0. The viscosity is found to be 972 cps at 25° C. measured using a Brookfield viscometer (model RVF) with a number 3 spindle at a speed of 30 rpm.

Example 3—Preparation Of Polyol Of Varonic K-215, Phthalic Anhydride, Diethylene Glycol To a three liter, four-neck, round bottom flask equipped with stirrer, thermometer, Barrett distilling receiver, condenser, and nitrogen inlet tube, is charged 695.5 grams of phthalic anhydride, 902.3 grams of diethylene glycol, and 402.2 grams of Varonic K-215 (20% by weight based on total weight of phthalic anhydride diethylene glycol, and such Varonic K-215. This mixture is heated to 225° C. with constant agitation and with a constant nitrogen sparge. After removing approximately 90% of the theoretical water 200 ppm of stannous octoate is added to the flask as an esterification catalyst. Additional material removed from the distilling receiver is replaced by an equal weight of diethylene glycol. The heating is carried out until the acid value of the product liquid polyol reaches 2.5. The product polyol has a hydroxyl number of 241.1, a viscosity of 1850 cps at 25° C. and contains 0.05% water.

Example 4—Preparation Of A Polyol Blend From Amidox C-5, Phthalic Anhydride, And Diethylene Glycol To a five liter, four-neck, round-bottom flask equipped with stirrer, thermometer, Barrett distilling receiver, condenser, and nitrogen inlet tube is charged 730.6 grams of phthalic anhydride, 938.1 grams of diethylene glycol, and 420.2 grams of Amidox C-5 (20% by weight based on total weight of phthalic anhydride, diethylene glycol and such Amidox C-5).

This mixture is heated to 225° C. with constant agitation and with a constant nitrogen sparge. After removing approximately 90% of the theoretical water, 200 ppm of stannous octoate is added to the flask as an esterification catalyst. Additional material removed from the distilling receiver is replaced by an equal weight of diethylene glycol. The heating is continued until the acid value of the product liquid is 0.8. The product polyol has a hydroxyl number of 249.0, a viscosity of 938 cps at 25° C., and contains 0.02% water.

Example 5—Preparation Of A Polyol Blend From Amidox C-5, PO-EO Block Polymer (Example F) Phthalic Anhydride, And Diethylene Glycol To a three liter, four-neck, round-bottom flask equipped with stirrer, thermometer, Barrett distilling receiver, condenser, and nitrogen inlet tube is charged 652.0 grams of phthalic anhydride, 804.0 grams of diethylene glycol, and 468.0 grams of Amidox C-5 and 116.0 grams of PO-EO block polymer (Example F).

This mixture is heated to 225° C. with constant agitation and with a constant nitrogen sparge. After removing approximately 90% of the theoretical water, 200 ppm of stannous octoate is added to the flask as an esterification catalyst. Additional material removed from the distilling receiver is replaced by an equal weight of diethylene glycol. The heating was continued until the acid value of the product liquid is 4.5. The product polyol has a hydroxyl number of 221.0, after adding 50 grams of diethylene glycol to insure the hydroxyl number of 241.0 the polyol has a viscosity of 600 cps at 25° C., and contains 0.15% water.

Example 6—Polyol Freon Solubility

Freon solubility in each of the polyols of Examples 1–5 is determined by measuring the maximum amount of trichlorofluoromethane (Freon 11, available commercially from the E.I. DuPont Company) which can be dissolved in each polyol before such becomes cloudy. This solubility is expressed in parts per hundred parts polyol (pphP).

Thus, fifty grams of polyol is added to an 180 ml beaker. The polyol, beaker, and a spatula are weighed. Freon R11 is added with stirring to the polyol until it becomes cloudy. This mixture is then stirred until enough freon evaporated to clear the blend. The weight of freon remaining is then determined.

The results are as follows:

TABLE VII

| Polyol Freon Solubility | |
|---|---|
| Polyol | pphP |
| Example 1 | 41.2 |
| Example 2 | 38.4 |
| Example 3 | 39.2 |
| Example 4 | 32.2 |
| Example 5 | 47.4 |

Example 7—Resin Prepolymer

Each of the polyols of Examples 1–5 are mixed (blended with) with) a urethane/isocyanurate forming catalyst and with a cell stablilizing surfactant to form a resin prepolymer blend suitable for reacting with organic isocyanate to form a cellular polymer, Each such resin prepolymer blend has the following composition:

TABLE VIII

| Resin Prepolymer Composition (100 wt. % total weight basis) | |
|---|---|
| Component | weight percent |
| polyol | 94 |
| potassium octoate[1] | 4 |
| silicon surfactant[2] | 2 |

TABLE VIII footnotes
[1]Example "I"
[2]Example "J"

When each such resin prepolymer blend composition is admixed with Mondur MR and foamed it is found that a cellular polymer having uniform small cell sizes is produced having excellent physical characteristics.

Example 8—Resin Prepolymer Freon Solubility

Freon solubility in each of these resin prepolymer blends of Example 7 is determined by measuring the maximum amount of trichlorofluoromethane (Freon 11 available commercially from the E.I. DuPont Company) which can be dissolved in each resin prepolymer blend before such becomes cloudy. Thus, solubility is expressed in parts per hundred parts resin (pphr).

Thus, fifty grams of each resin prepolymer blend are added to an 180 ml beaker. The resin, beaker, and a spatula are weighed. Freon R-11 is added with stirring to the resin until it becomes cloudy. This mixture is then stirred until enough freon evaporated to clear the blend. The weight of freon remaining is then determined.

The results are as follows:

TABLE IX

| Resin Prepolymer Freon Solubility | |
|---|---|
| Resin Prepolymer From Polyol of: | pphr |
| Example 1 | 38.4 |
| Example 2 | 40.0 |
| Example 3 | 28.6 |
| Example 4 | 36.2 |
| Example 5 | 56.2 |

Example 9

To a 5 liter, four-neck, round-bottom flask equipped with a stirrer, thermometer, nitrogen inlet tube, and a distilling head consisting of a straight adapter with a sealed-on Liebig condenser, there is added 1480 grams (10 moles) of phthalic anhydride, 2360 grams (20 moles) of 1,6-hexanediol, and 960 grams (1.99 moles) of Makon 6. The mixture is heated to 220° C. with stirring and kept at this temperature until the acid number is 6 or lower. The reaction mixture is then cooled to room temperature and analyzed. The product is a liquid polyol at 25° C. The hydroxyl number is found to be about 267.1 and the viscosity is 2100 centipoises at 25° C. The product has a Freon solubility of about 40 pphP.

Example 10

To a 5 liter, four-neck, round-bottom flask equipped with a stirrer, thermometer, nitrogen inlet tube, and a distilling head consisting of a straight adapter with a sealed-on Liebig condenser, there is added 740 grams (5 moles) of phthalic anhydride, 1940 grams (10 moles) of tetraethylene glycol and 670 grams (1.39 moles) of Makon 6. The mixture is heated to 220° C. with stirring and kept at this temperature until the acid number reaches 6. The reaction mixture is then cooled to room temperature and analyzed. The hydroxyl number of the colorless liquid product is found to be about 200 and its viscosity is 1500 centipoises at 25° C. The product has a Freon solubility of about 45 pphP.

Example 11

To a 5 liter, four-neck, round-bottom flask equipped with a stirrer, thermometer, nitrogen inlet tube, and a distilling head consisting of a straight adapter with a sealed-on Liebig condenser, there is added 1480 grams (10 moles) of phthalic anhydride, 1908 grams (18 moles) of diethylene glycol, 134 grams (1.0 moles) of trimethylolpropane and 880.5 grams (1.83 moles) of Makon 6. The mixture is heated to 220° C. with stirring and kept at this temperature until the acid number is 6. The hydroxyl number of the colorless liquid polyester polyol phthalate is found to be about 276.7.

This example illustrates that triols in controlled amount can be incorporated in a starting mixture with phthalic anhydride, diol of formula (1), and hydrocarbon modifier without producing gelation and also that the product has improved Freon solubility compared to the same composition made without any polyalkoxylated modifier.

Example 12

To a 5 liter, four-neck, round-bottom flask equipped with a stirrer, thermometer, nitrogen inlet tube, and a distilling head consisting of a straight adapter with a sealed-on Liebig condenser, there is added 1480 grams (10 moles) of phthalic anhydride, 1908 grams (18 moles) of diethylene glycol, 92 grams (1.0 moles) of glycerine and 870 grams (1.81 moles) of Makon 6. The mixture is kept to 220° C. with stirring and kept at this temperature until the acid number is 6. The hydroxyl number of the colorless liquid polyester polyol phthalate product is found to be about 279.9.

This Example supports the conclusions reached in the preceding Example 11.

Example 13

The procedure of Example C is repeated except that 450 grams (0.93 moles) of Makon 6 are also present during the reaction. The product is a liquid polyol having a viscosity of about 16,000 centipoises at 25° C. and a hydroxyl number of 284.

Preferably, a given mixture of phthalic anhydride bottoms composition polyol and low molecular weight polyalkoxylated modifier, in order for esterification to occur, is heated with mixing at a temperature ranging from about 195 to 250° C. (preferably from about 210° to 240° C.) under liquid phase conditions. This heating or contacting between low molecular weight polyalkoxylated nonionic modifier, polyol and phthalic anhydride bottoms composition is continued until a desired extent of esterification has been achieved. Preferably such heating is continued until the resulting product reaches an hydroxyl number ranging from about 200 to 600 and an acid number ranging from about 0.5 to 7, and more preferably until such reaches an hydroxyl number ranging from about 270 to 400 and an acid number ranging from about 2 to 7.

It is surprising and unexpected fact that, despite the complex nature of the composition produced by reacting phthalic anhdyride bottoms with a diol of formula (1) and a low molecular weight polyalkoxylated modifier as described herein there is produced a product polyol blend which can be readily and simply utilized for reaction with isocyanate to produce (in the presence of appropriate catalyst) polyurethane-polyisocyanurate foams which have excellent properties that appear generally to be about equal to the properties of corresponding foams made with esters produced by reacting substantially pure phthalic anhydride with polyol of formula (1) as in Example A.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

We claim:

1. A process for preparing a high aromatic content low acid number self-compatibilized phthalate polyester polyol blend comprising the step of heating at a temperature ranging from about 180° to 240° C. a starting mixture which comprises on a 100 mole percent total basis:
   (A) from about 15 to 40 mole percent of at least one phthalic acidic material selected from the group consisting of phthalic anhydride, phthalic acid, isophthalic acid, terephthalic acid, and mixtures thereof,
   (B) from about 40 to 75 mole percent of at least one aliphatic diol of the formula:

$$HO-R^1-OH$$

where: $R_1$ is a divalent radical selected from the group consisting of:
   (a) alkylene radicals each containing from 2 through 6 carbon atoms
   (b) radicals of the formula:

$$-(R^3O)_n-R^3-$$

where: $R^3$ is an alkylene radical containing from 2 through 3 carbon atoms, and n is an integer of from 1 through 3, and
   (C) from about 0.4 to 28 mole percent of at least one nonionic surfactant compound which is characterized by:
   (a) containing from about 10 to 600 carbon atoms per molecule, and
   (b) containing at least one and not more than four hydroxyl radicals per molecule,
   (c) containing from about 4 to 240 radicals per molecule of the formula:

$$-(R^3O)-$$

where $R^3$ is as above defined,
said heating being continued until a liquid reaction product is produced which is characterized by having:
   (i) an hydroxyl number ranging from about 200 to 500,
   (ii) an acid number ranging from about 0.1 to 7,
   (iii) a sap number ranging from about 130 to 400, and
   (iv) a viscosity ranging from about 200 to 50,000 centipoises at 25° C. measuring using a Brookfield viscometer.

2. The process of claim 1 wherein during said heating said starting mixture further contains, on such 100 mole percent total weight basis, from 0 to about 1.0 mole percent of at least one nonionic propoxylate ethoxylate compound having a molecular weight of from about 1200 to 13,000.

3. The process of claim 2 wherein said propoxylate ethoxylate compound is characterized by having:
   (1) a molecular weight of at least from about 3000 to 8000,
   (2) a solubility in diethylene glycol phthalate to such an extent that at least 5 parts by weight are soluble in each 100 parts by weight of a diethylene glycol phthalate (which is a stoichiometric reaction product of one mole of phthalic acid anhydride with two moles of diethylene glycol (or equivalent),
   (3) at least one block polyoxypropylene group which contains from about 25 to 50 repeating propoxy units,
   (4) at least one block polyoxyethylene group which contains from about 40 to 125 repeating ethoxy units, and
   (5) both a hydrophobic moiety and a hydrophilic moiety,
provided that the total alkoxyl content includes at least about 40 weight percent of ethylene oxide.

4. The process of claim 2 wherein, after said heating, for each 100 parts by weight of such reaction product from 0 to about 30 parts by weight of at least one said propoxylate ethoxylate compound is admixed with and dissolved in said reaction product while maintaining a temperature ranging from about 50° to 100° C., provided that the total quantity of said nonionic propoxylate ethoxylate compound present in said reaction product ranges from greater than 0 to about 30 weight percent on a 100 weight percent total reaction product basis.

5. The process of claim 1 wherein during said heating said starting mixture further contains on such 100 weight percent total starting mixture basis from greater than 0 to about 20 mole percent of at least one further polyol selected from the group consisting of glycerol, trimethylolpropane, sorbitol, trimethylolethane, pentaerythritol, and mixtures thereof 6. The process of claim 1 wherein during said heating said starting mixture further contains, on such 100 weight percent total starting mixture basis from greater than 0 to about 20 mole percent of at least one further acid compound selected from the group consisting of trimellitic anhydride, trimellitic acid, and mixtures thereof.

7. The process of claim 1 wherein during said heating said starting mixture further contains on such 100 weight percent total starting mixture basis from greater than 0 to about 20 mole percent of at least one polycarboxylated aliphatic acid compound selected from the group consisting of adipic acid, glutaric acid, succinic acid, and mixtures thereof.

8. The process of claim 1 wherein during said heating said phthalic acidic material comprises a phthalic anhydride bottoms composition.

9. The process of claim 1 wherein during said heating said temperature ranges from about 210° to 240° C.

10. The process of claim 2 wherein said phthalic acidic material comprises phthalic anhydride, said aliphatic diol comprises diethylene glycol, and said propoxylate ethoxylate is characterized by having:
   (1) a molecular weight of at least from about 3000 to 8000,
   (2) a solubility in diethylene glycol phthalate to such an extent that at least 5 parts by weight are soluble in each 100 parts by weight of a diethylene glycol phthalate (which is a stoichiometric reaction product of one mole of phthalic acid anhydride with two moles of diethylene glycol (or equivalent),
   (3) at least one block polyoxypropylene group which contains from about 25 to 50 repeating propoxy units,
   (4) at least one block polyoxyethylene group which contains from about 40 to 125 repeating ethoxy units, and (5) both a hydrophobic moiety and a hydrophilic moiety, provided that the total alkoxyl content includes at least about weight percent of ethylene oxide.

11. The polyol produced by the process of claim 1.
12. The polyol produced by the process of claim 2.
13. The polyol produced by the process of claim 3.
14. The polyol produced by the process of claim 4.
15. The polyol produced by the process of claim 5.
16. The polyol produced by the process of claim 6.
17. The polyol produced by the process of claim 7.
18. The polyol produced by the process of claim 8.
19. The polyol produced by the process of claim 10.
20. A self-compatibilizing phthalate polyester polyol blend comprising a reaction product of a starting mixture which comprises on a 100 mole percent total basis:

(A) from about 15 to 40 mole percent of at least one phthalate acidic material selected from the group consisting of phthalic anhydride, phthalic acid, isophthalic acid, terephthalic acid, and mixtures thereof, (B) from about 40 to 75 mole percent of at least one low molecular weight aliphatic diol characterized by the generic formula:

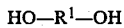  (1)

HO—R$^1$—OH where: R$^1$ is a divalent radical selected from the group consisting of
(a) alkylene radicals each containing from 2 through 6 carbon atoms, and
(b) radicals of the formula:

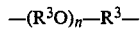  (2)

—(R$^3$O)$_n$—R$^3$— where: R$^3$ is an alkylene radical containing from 2 through 3 carbon atoms, and n is an integer of from 1 through 3, and
(c) mixtures thereof, and (C) from about 0.4 to 17.0 mole percent of at least one low molecular weight polyalkoxylated compound which is characterized by:
(a) having a molecular weight of at least about 130 to 900,
(b) containing from about 8 to 60 carbon atoms per molecule, and
(c) containing at least one and not more than four radicals per molecule, which are each selected from the group consisting of carboxyl, hydroxyl, and mixtures thereof said reaction product being prepared by heating said starting mixture at a temperature ranging from about 180 to 240 degrees C. until said reaction product is a liquid which is characterized by having:
(A) an hydroxyl number ranging from about 200 to 500,
(B) an acid number ranging from about 0.1 to 7
(C) a saponification value ranging from about 130 to 400,
(D) a viscosity ranging from about 200 to 50,000 centipoises measured at 25° using a Brookfield viscometer.

21. The polyol blend of claim 20 wherein said polyalkoxylated compound is characterized by having:
(1) a molecular weight of at least from about 3000 to 8000,
(2) a solubility in diethylene glycol phthalate to such an extent that at least 5 parts by weight are soluble in each 100 parts by weight of a diethylene glycol phthalate which is equivalent to a stoichiometric reaction product of one mole of phthalic acid anhydride with two moles of diethylene glycol,
(3) at least one block polyoxypropylene group which contains from about 25 to 50 repeating propoxy units,
(4) at least one block polyoxyethylene group which contains from about 40 to 125 repeating ethoxy units, and
(5) both a hydrophobic moiety and a hydrophilic moiety, provided that the total alkoxyl content includes at least about 40 weight percent of ethylene oxide.

* * * * *